(12) United States Patent  (10) Patent No.: US 8,682,512 B2
Norton                    (45) Date of Patent:     Mar. 25, 2014

(54) FUEL OPTIMIZING SYSTEM FOR A MOBILE ASSET, AND A RELATED METHOD THEREOF

(75) Inventor: Daniel George Norton, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 119 days.

(21) Appl. No.: 13/328,438

(22) Filed: Dec. 16, 2011

(65) Prior Publication Data

US 2013/0158752 A1    Jun. 20, 2013

(51) Int. Cl.
*G05D 1/00*    (2006.01)

(52) U.S. Cl.
USPC ............................................. 701/19; 123/590

(58) Field of Classification Search
USPC .............. 701/19, 123, 99–103; 123/557, 590; 48/180.1
See application file for complete search history.

(56) References Cited

U.S. PATENT DOCUMENTS

| | | | |
|---|---|---|---|
| 6,543,395 B2 * | 4/2003 | Green | 123/27 GE |
| 7,019,626 B1 | 3/2006 | Funk | |
| 7,509,209 B2 * | 3/2009 | Davis et al. | 701/103 |
| 7,861,518 B2 | 1/2011 | Federle | |
| 7,913,664 B2 | 3/2011 | Williams et al. | |
| 2007/0175459 A1 | 8/2007 | Williams et al. | |
| 2007/0295316 A1 | 12/2007 | Davis et al. | |
| 2008/0098726 A1 | 5/2008 | Donaldson et al. | |
| 2008/0262701 A1 | 10/2008 | Williams et al. | |
| 2011/0079197 A1 | 4/2011 | Stewart et al. | |
| 2011/0209459 A1 | 9/2011 | Hancu et al. | |

FOREIGN PATENT DOCUMENTS

| | | |
|---|---|---|
| DE | 102010036131 A1 | 3/2012 |
| EP | 2336529 A2 | 6/2011 |
| JP | 2000145488 A | 5/2000 |
| WO | 9421911 A1 | 9/1994 |
| WO | 2003076788 A1 | 9/2003 |

OTHER PUBLICATIONS

Kessels et al., "Integrated Energy & Emission Management for Hybrid Electric Truck with SCR Aftertreatment", 2010 IEEE Vehicle Power and Propulsion Conference (VPPC); pp. 1-6.
Search Report and Written Opinion from corresponding PCT Application No. PCT/US2012/064929 dated Mar. 6, 2013.

* cited by examiner

*Primary Examiner* — Thomas Black
*Assistant Examiner* — Luke Huynh
(74) *Attorney, Agent, or Firm* — Joseph J. Christian

(57) ABSTRACT

A method includes determining a plurality of characteristic profiles associated with a mobile asset moving from a first operating point to a second operating point along a predefined path. The method further includes determining a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values. The method also includes controlling a fuel delivery system of the mobile asset so as to deliver the plurality of fuels to the at least one engine cylinder based on the fuel combustion ratio.

25 Claims, 3 Drawing Sheets

FUEL OPTIMIZING SYSTEM FOR A MOBILE ASSET, AND A RELATED METHOD THEREOF

BACKGROUND

The invention relates generally to mobile assets, and more specifically to a fuel optimizing system for engines using more than one fuel.

Generally mobile assets having engines, for example, compression-ignition engines operate by directly injecting a fuel (e.g., diesel fuel) into compressed air in one or more piston-cylinder assemblies, such that the heat of the compressed air ignites the fuel-air mixture. The direct fuel injection atomizes the fuel into droplets, which evaporate and mix with the compressed air in the combustion chambers of the piston-cylinder assemblies. The fuel-air ratio affects engine performance, efficiency, exhaust pollutants, and other engine characteristics. Exhaust emissions generally include pollutants such as carbon oxides (e.g., carbon monoxide), nitrogen oxides (NOx), sulfur oxides (SOx), and particulate matter (PM). The amount and relative proportion of these pollutants varies according to the fuel-air mixture, compression ratio, injection timing, environmental conditions (e.g., atmospheric pressure, temperature, etc.), and so forth.

A dual-fuel engine is an alternative internal combustion engine designed to run on more than one fuel, for example, natural gas and diesel, each stored in separate vessels. Such engines are capable of burning a mixture of the resulting blend of fuels in the combustion chamber and the fuel injection or spark timing may be adjusted according to the blend of fuels in the combustion chamber. For dual fuel operation where one of the fuel is premixed with air, a reduction in nitrogen oxide (NOx) and particulate matter (PM) emissions is enabled by combusting a relatively larger fraction of the premixed fuel.

Relative costs and availability of different fuels are constantly in flux. Proportions of different fuels may also have an effect on the exhaust pollutants from the engine.

There is a need for an improved system and method for engines operating on more than one fuel so as to optimize fuel usage while meeting emission standards.

BRIEF DESCRIPTION

In accordance with one exemplary embodiment of the present invention, a method for operating a mobile asset utilizing a plurality of fuels is disclosed. The method includes determining a plurality of characteristic profiles associated with a mobile asset moving from a first operating point to a second operating point along a predefined path. The method further includes determining a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values. The fuel combustion ratio includes a ratio of the plurality of fuels to be delivered to the at least one engine cylinder. The method also includes controlling a fuel delivery system of the mobile asset so as to deliver the plurality of fuels to the at least one engine cylinder based on the fuel combustion ratio.

In accordance with another exemplary embodiment of the present invention, a system having a fuel optimizing unit is disclosed. The fuel optimizing unit is configured to determine a plurality of characteristic profiles associated with a mobile asset utilizing a plurality of fuels, moving from a first operating point to a second operating point along a predefined path. The fuel optimizing unit is further configured to determine a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values. The fuel combustion ratio includes a ratio of the plurality of fuels to be delivered to the at least one engine cylinder. The fuel optimizing unit is also configured to control a fuel delivery system of the mobile asset so as to deliver the plurality of fuels to the at least one engine cylinder based on the fuel combustion ratio.

In accordance with another exemplary embodiment of the present invention, a non-transitory computer readable medium encoded with a program is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with the embodiments discussed herein, a method for operating a mobile asset utilizing a plurality of fuels is disclosed. The method includes determining a plurality of characteristic profiles associated with a mobile asset moving from a first operating point to a second operating point along a predefined path. The method further includes determining a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values. The fuel combustion ratio is a ratio of the plurality of fuels to be delivered to the at least one engine cylinder. The method also includes controlling a fuel delivery system of the mobile asset so as to deliver the plurality of fuels to the at least one engine cylinder based on the fuel combustion ratio. In accordance with some embodiments, a related system is disclosed.

Figure 1:
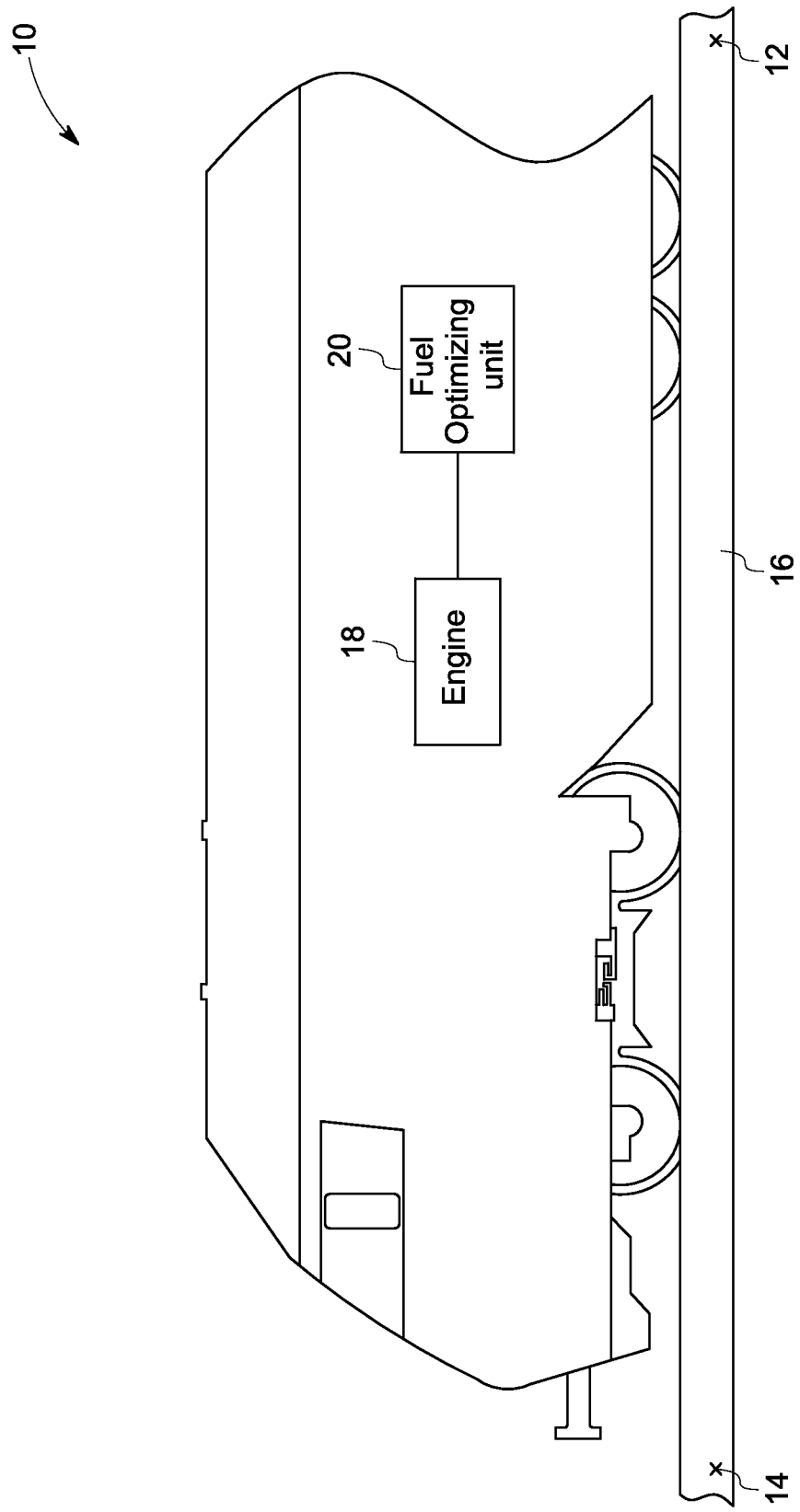
FIG. 1 is a diagrammatical representation of a mobile asset, for example a locomotive, having a fuel optimizing unit in accordance with an exemplary embodiment of the present invention.

Referring to FIG. 1, a mobile asset 10 moving from a first operating point 12 to a second operating point 14 along a predefined path 16 is disclosed. The term "profiles" is used herein to describe the overall operating parameters and conditions of the mobile asset 10. These profiles may alter the manner in which the operating systems of the mobile asset 10 can be controlled in response to operational inputs. In the illustrated embodiment, the mobile asset 10 is a locomotive. In other embodiments, the mobile asset 10 can be a vehicle or other engine powered assembly. Suitable vehicles include passenger and non-passenger vehicles, hybrid vehicles, offhighway vehicles, on-road vehicles (such as tractor trailers), tracked vehicles, air-borne vehicles, rail vehicles, and marine vessels. A mobile asset's configuration may include performance variables such as the peak output rating of the mobile asset 10, the correlation between the power level settings and the percentage of full power generated, engine emissions curves, acoustic emissions, electro-magnetic emissions, the number of traction motors used, fuel economy performance, adhesion limits, the organization, presentation and functionality of operator controls, communications protocol, auxiliary functions, security measures, and the like. External factors that can affect the mobile asset's desired configuration can include tax liabilities for operation, weather considerations, damage risk (due to crime or conflict), proximity to population centers, and the like.

In the illustrated embodiment, the mobile asset 10 is driven by an engine 18 utilizing a plurality of fuels. In the exemplary engine 18, a reduction in nitrogen oxide (NOx) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine 18. If the cost of diesel increases relative to the cost of the natural gas, more natural gas may be used resulting in reduced cost and emissions. If the cost of natural gas is increased relative to the cost of the diesel, then more diesel may be used to drive the engine 18. It should be noted herein that in certain embodiments, the mobile asset 10 may utilize other fuels instead of diesel, natural gas. The optimization of fuel usage is also dependent on various characteristic profiles associated with the mobile asset 10 and may vary as a function of time and a corresponding location of the asset 10 along the path 16. In accordance with the embodiments of the present invention, a fuel optimizing unit 20 is used to optimize fuel utilization based on cost and availability while ensuring emission compliance along the travel from the first operating point 12 to the second operating point 14 along the predefined path 16. The fuel optimizing unit 20 is explained in greater detail below with reference to subsequent figures.

Figure 2:
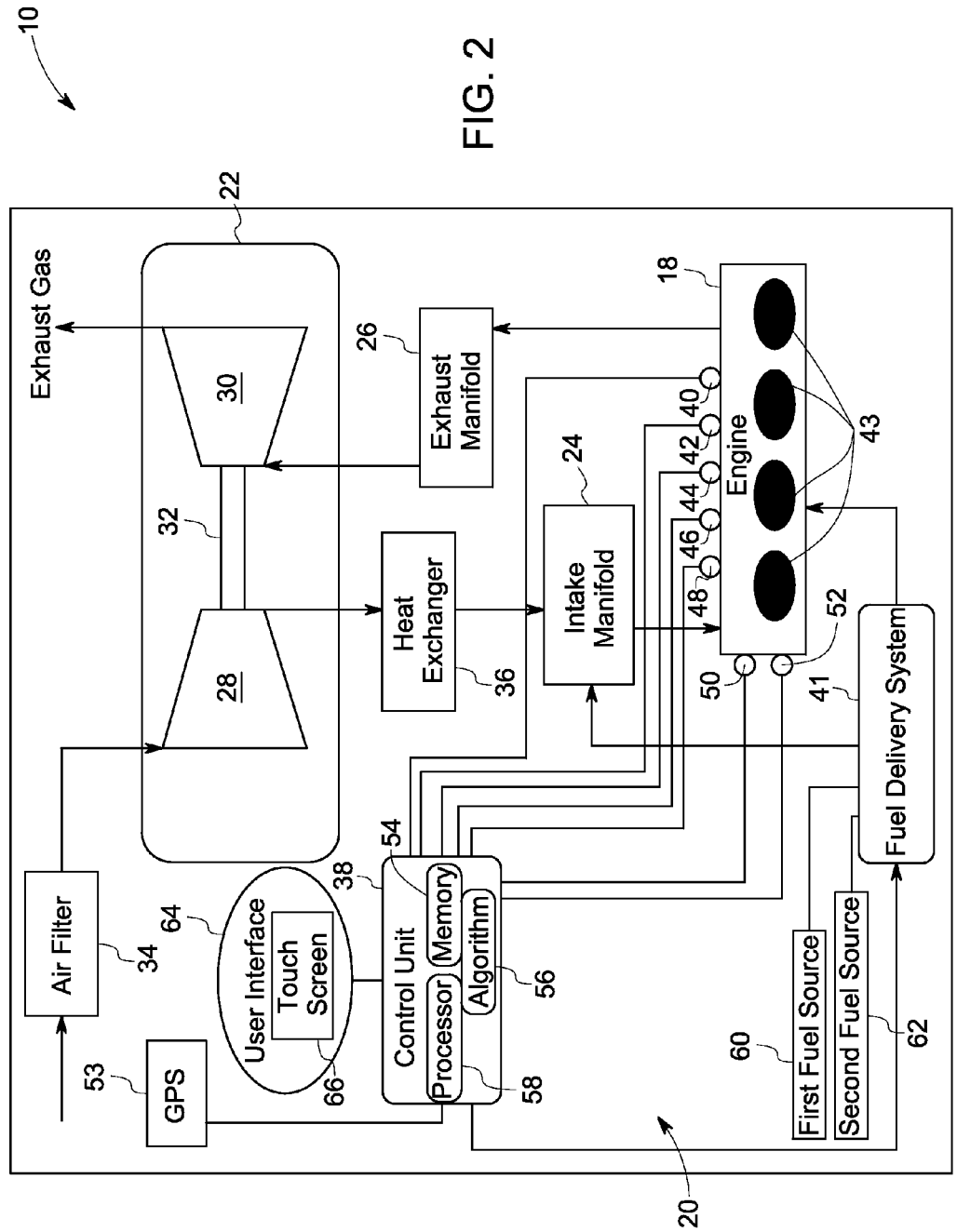
FIG. 2 is a diagrammatical representation of a mobile asset with detailed view of a fuel optimizing unit in accordance with an exemplary embodiment of the present invention.

Referring to FIG. 2, the mobile asset 10 having fuel optimization features is illustrated in accordance with certain embodiments of the present technique. The mobile asset 10 includes a turbo-charger 22 and the compression-ignition engine, e.g. the diesel engine 18. A motor-generator unit (not shown) may be mechanically coupled to the turbocharger 22. As discussed in further detail below, embodiments of the present technique provide monitoring and control features, such as sensors and control logic, to optimize utilization of fuel.

The illustrated engine 18 includes an air intake manifold 24 and an exhaust manifold 26. The turbo-charger 22 includes a compressor 28 and a turbine 30 and is operated to supply compressed air to the intake manifold 24 for combustion within the engine 18. The turbine 30 is coupled to the exhaust manifold 26 for extracting energy from exhaust gases for rotating a turbocharger shaft 32 connected to the compressor 28. The compressor 28 draws ambient air through a filter 34 and provides compressed air to a heat exchanger 36. The temperature of air is increased due to compression. The compressed air flows through the heat exchanger 36 such that the temperature of air is reduced prior to delivery into the intake manifold 24 of the engine 18. In one embodiment, the heat exchanger 36 is an air-to-water heat exchanger, which utilizes a coolant to facilitate removal of heat from the compressed air. In another embodiment, the heat exchanger 36 is an air-to-air heat exchanger, which utilizes ambient air to facilitate removal of heat from compressed air. It should be noted herein that the illustrated configuration of engine 18 and associated components, is an exemplary embodiment and should not in any way be construed as limiting the scope. In other words, the exemplary fuel optimizing unit 20 may be used for any type of engines or other mobile assets utilizing a plurality of fuels so as to optimize fuel utilization based on cost and availability while ensuring emission compliance during travel.

The fuel optimizing unit 20 includes a control unit 38, and a plurality of sensors including but not limited to an engine emission level sensor 40, a fuel usage level sensor 42, a power output sensor 44, an engine load sensor 46, an engine speed sensor 48, fuel cost meter 50, and a fuel injection profile sensor 52. The fuel optimizing unit 20 may also include a global positioning sensor (GPS) 53. In the illustrated embodiment, the control unit 38 is an electronic fuel injection control unit for the engine 18. In another embodiment, the control unit 38 is an electronic logic control unit that is programmable by a user. The control unit 38 may be operable to produce a signal to control operation of a fuel delivery system 41 having a plurality of fuel injection pumps (not shown) for driving a plurality of plurality of fuel injectors (not shown) for injecting fuel into a plurality of cylinders 43 of the engine 18. A piston (not shown) is slidably disposed in each cylinder 43 and reciprocates between a top dead center and a bottom dead center position. The control unit 38 may receive an engine emission level signal from the level sensor 40, a fuel usage level signal from the sensor 42, a power output signal from the power sensor 44, an engine load signal from the load sensor 46, an engine speed signal from the speed sensor 48, fuel cost from the meter 50, and a fuel injection profile signal from the injection sensor 52.

The control unit 38 may also receive one or more signals associated with at least one of a distance from the first operating point to the second operating point along the predefined path, terrain profile associated with the path, ambient temperature and pressure, time required to traverse the distance, and location of one or more fuel stations along the predefined path from the GPS 53.

In the illustrated embodiment, the control unit 38 may further include a memory 54, an algorithm 56, and a processor 58. The memory 54 may be configured to store predefined information associated with the mobile asset 10. For example, the memory may store information relating but not limited to temperature, and pressure of the engine 18, fuel injection timing and pressure, engine speed, power output of the engine 18, engine emission level, fuel usage level, engine load, fuel cost, distance from the first operating point to the second operating point along the predefined path, terrain profile associated with the path, ambient temperature and pressure, time required to traverse the distance, and location of one or more fuel stations along the predefined path, or the like. Furthermore, the memory 54 may be configured to store actual sensed/detected information from the above-mentioned sensors. The algorithm 56 facilitates the processing of signals from the above-mentioned plurality of sensors. The characteristic profiles associated with the mobile asset 10 include the output from all the above-mentioned sensors discussed above and also the information stored in the memory 54.

The processor 58 may include a range of circuitry types, such as a microprocessor, a programmable logic controller, a logic module, etc. The processor 58 in combination with the algorithm 56 may be used to perform the various computational operations relating to determination of a combustion ratio of the plurality of fuels to be delivered to each cylinder 43 of the engine 18. It should be noted herein that the combustion ratio is the ratio of the plurality of fuels delivered to each cylinder 43 of the engine 18. For example, if the engine 18 is utilizing diesel and natural gas, then the combustion ratio would be ratio of diesel to natural gas to be delivered to each cylinder 43. In the illustrated embodiments, the mobile asset 10 has a first fuel source 60 and a second fuel source 62 for feeding a first fuel and a second fuel respectively, to the corresponding cylinders 43 of the engine 18. The first and second fuels may be injected to the cylinders 43 via the intake manifold 24 or may also be injected directly to the cylinders. It should be noted herein that in some embodiments, more than two fuels may also be used.

The processor 58 is configured to determine the fuel combustion ratio of the plurality of the fuels associated with each engine cylinder 43 of the mobile asset 10 based on the plurality of characteristic profiles. In some embodiments, the processor 58 determines the combustion ratio based on the output from the sensors 40, 42, 44, 46, 48, 50 and 52. In certain other embodiments, the processor 58 determines the combustion ratio based on the output from the GPS 53. In a specific embodiment, the processor 58 utilizes information from the GPS 53 in conjunction with the information from the other sensors 40, 42, 44, 46, 48, 50 and 52 to determine the combustion ratio. Additionally, the processor 58 may also use the information stored in the memory 54. The processor 58 outputs a control signal to the fuel delivery system 41 so as to deliver the plurality of fuels to the cylinders 43 based on the combustion ratio. The combustion ratio is determined in such a way so to maintain a plurality of actual values associated with usage of the plurality of fuels to less than or equal to predefined corresponding threshold values. In one embodiment, an actual cost associated with usage of the plurality of fuels is maintained to less than or equal to a predefined threshold cost. In another embodiment, an actual emission level associated with usage of the plurality of fuels is maintained to less than or equal to a predefined threshold emission level. In yet another embodiment, an actual quantity of fuel in the mobile asset is maintained to less than or equal to a predefined threshold quantity. Overall, the fuel optimizing unit 20 is used to optimize fuel utilization based on cost and availability while ensuring emission compliance along the entire travel from the first operating point to the second operating point along the predefined path. For example, if two fuels are used, the optimizing unit 20 ensures maximum usage of a secondary fuel and adequate primary fuel exists to complete the travel, taking into consideration of the characteristics profiles.

As discussed previously, relative costs and availability of different fuels are constantly in flux. Also, proportions of different fuels may also have an effect on the exhaust pollutants from the engine 18. In one embodiment, the fuel optimizing unit 20 takes into consideration sensed engine emission level, a fuel usage level (i.e. quantity of fuel required for the travel, remaining quantity of fuel in the fuel sources 60, 62) the engine power output, the engine load, the engine speed, fuel cost, and the fuel injection profile. In some embodiments, the fuel optimizing unit 20 may take into consideration distance from the first operating point to the second operating point along the predefined path, terrain profile associated with the path, ambient temperature and pressure, time required to traverse the distance, and location of one or more fuel stations along the predefined path, or the like. Other suitable parameters are also envisaged.

It should be noted herein parameters discussed herein may dynamically vary as a function of time and location of asset 10. In accordance with the embodiment of the present invention, the plurality of characteristic profiles associated with the mobile asset 10 are determined as a function of time and a corresponding location of the mobile asset 10 along the predefined path. Hence, the fuel optimizing unit 20 may also determine the fuel combustion ratio as a function of time and a corresponding location of the mobile asset 10 based on the one or more of the plurality of characteristic profiles. The frequency of sensing the characteristics profiles and determination of the combustion ratio may vary depending on the type of application.

In certain embodiments, the control unit 38 may output data to a user interface 64. Advantageously, the user interface 64 may facilitate inputs via a touch screen 66 from a user to the control unit 38 and provides a mechanism through which a user can manipulate data and sensed properties from the control unit 38. As will be appreciated by those skilled in the art, the user interface 64 may include a command line interface, menu driven interface, and graphical user interface. The control unit 38 is operable to adjust the combustion ratio affecting the cost and engine emissions associated with the fuel usage. In some embodiments, the control unit 38 may communicate to a user via the user interface 64 whether it is possible to reach a predetermined destination with available of fuel(s) in the asset 10, while meeting emissions targets.

Figure 3:
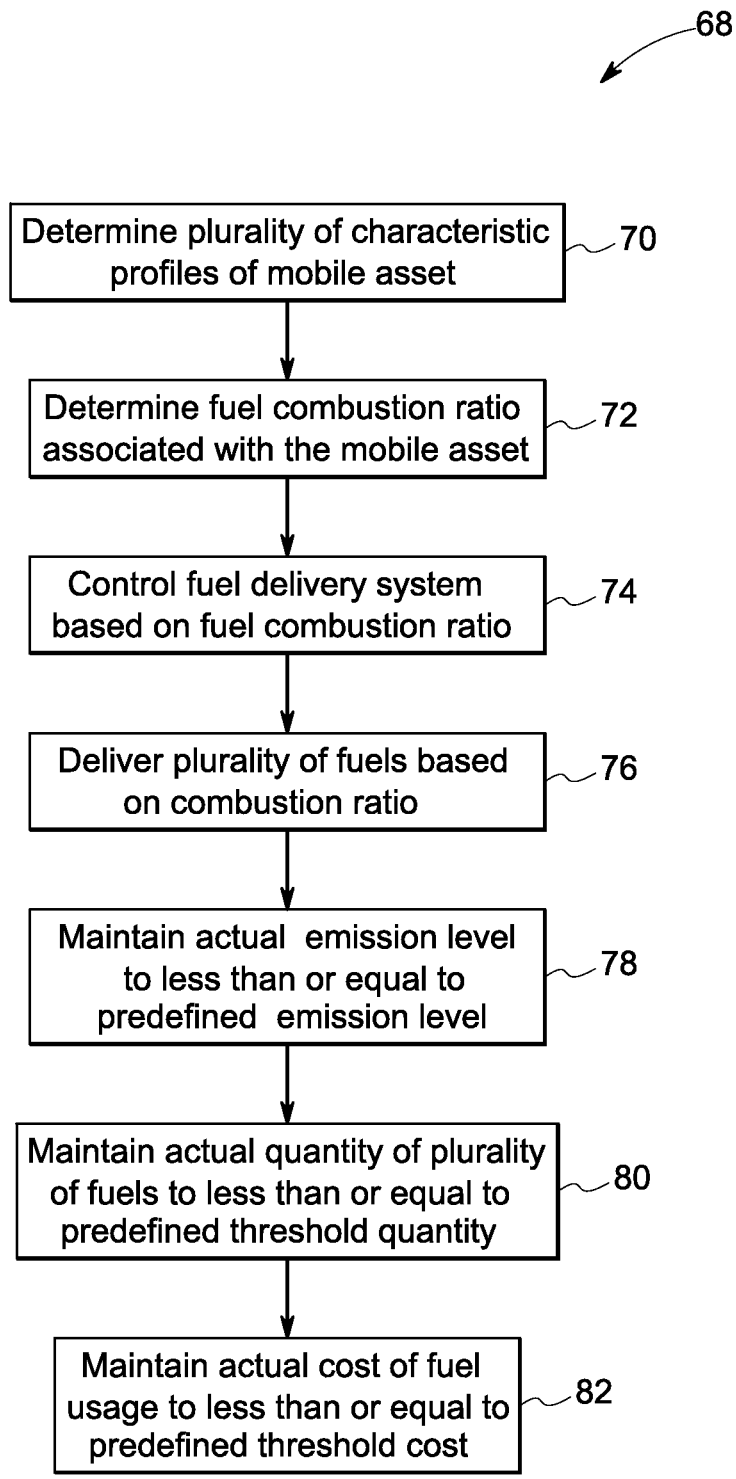
FIG. 3 is a flow diagram illustrating exemplary steps involved in optimization of fuel in a mobile asset in accordance with an exemplary embodiment of the present technique.

Referring to FIG. 3, a flow diagram 68 illustrating a plurality of steps involved in optimization of fuel for a mobile asset is disclosed. Initially, a plurality of characteristic profiles associated with the mobile asset moving from one operating point to another operating point along a predefined path is determined as represented by the step 70. In one embodiment the characteristic profiles may include asset sensed information. In another embodiment, the characteristics profiles may include GPS information. In yet another embodiment the characteristics profile may include memory stored information. The characteristics profile may be determined as a function of time and location of the mobile asset. Then, a fuel combustion ratio of the plurality of the fuels associated with at least one engine cylinder of the mobile asset is determined based on the plurality of characteristic profiles as represented by the step 72. It should be noted herein that the fuel combustion ratio refers to a ratio of the plurality of fuels to be delivered to the at least one engine cylinder of the mobile asset. The fuel combustion ratio may also be determined as a function of time and location of the mobile asset.

A fuel delivery system is controlled based on the determined fuel combustion ratio as represented by the step 74. The fuel delivery system delivers the plurality fuels based on the determined fuel combustion ratio as represented by the step 76. As a result, the actual emission level associated with usage of the plurality of fuels is maintained to less than or equal to a predefined threshold emission level as represented by the step 78. An actual quantity of the plurality of fuels in the mobile asset is maintained less than or equal to a predefined threshold quantity as represented by the step 80. The actual cost associated with usage of the plurality of fuels is maintained to less than or equal to a predefined threshold cost as represented by the step 82.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for operating a mobile asset utilizing a plurality of fuels, the method comprising:
   determining a plurality of characteristic profiles associated with the mobile asset moving from a first operating point to a second operating point along a predefined path, as a function of time and a corresponding location along the predefined path;

determining a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values; wherein the fuel combustion ratio comprises a ratio of the plurality of fuels to be delivered to the at least one engine cylinder; and controlling a fuel delivery system of the mobile asset so as to deliver the plurality of fuels to the at least one engine cylinder based on the fuel combustion ratio.

2. The method of claim 1, wherein the plurality of characteristic profiles comprises at least one asset sensed information comprising at least one of an engine emission level, a fuel usage level, a power output, an engine load, engine speed, fuel cost, and fuel injection profile.

3. The method of claim 1, wherein the plurality of characteristic profiles comprises a global positioning sensor (GPS) information comprising at least one of a distance from the first operating point to the second operating point along the predefined path, terrain profile associated with the path, ambient temperature and pressure, time required to traverse the distance, and location of one or more fuel stations along the predefined path.

4. The method of claim 1, wherein the plurality of characteristic profiles comprises memory stored information associated with the mobile asset.

5. The method of claim 1, wherein maintaining the plurality of actual values associated with usage of the plurality of fuels to less than or equal to the predefined corresponding threshold values comprises maintaining an actual emission level associated with usage of the plurality of fuels to less than or equal to a predefined threshold emission level.

6. The method of claim 1, wherein maintaining the plurality of actual values associated with usage of the plurality of fuels to less than or equal to the predefined corresponding threshold values comprises maintaining an actual quantity of the plurality of fuels in the mobile asset to less than or equal to a predefined threshold quantity.

7. The method of claim 6, wherein maintaining the plurality of actual values associated with usage of the plurality of fuels to less than or equal to the predefined corresponding threshold values comprises maintaining an actual cost associated with usage of the plurality of fuels to less than or equal to a predefined threshold cost.

8. The method of claim 1, comprising maintaining the plurality of actual values associated with usage of the plurality of fuels to less than or equal to the predefined corresponding threshold values as a function of time and a corresponding location of the mobile asset along the predefined path.

9. The method of claim 1, wherein the plurality of fuels comprises diesel, and natural gas.

10. The method of claim 1, wherein the mobile asset comprises a locomotive.

11. A system comprising:
a fuel optimizing unit comprising a plurality of sensors disposed in a mobile asset utilising a plurality of fuels, for sensing a plurality of characteristic profiles comprising at least one of an engine emission level, a fuel usage level, a power output, an engine load, engine speed, fuel cost, and fuel injection profile as a function of time and a corresponding location of the mobile asset moving from a first operating point to a second operating point along a predefined path, wherein the fuel optimizing unit is configured to:

determine a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values; wherein the fuel combustion ratio comprises a ratio of the plurality of fuels to be delivered to the at least one engine cylinder; and control a fuel delivery system of the mobile asset so as to deliver the plurality of fuels to the at least one engine cylinder based on the fuel combustion ratio.

12. The system of claim 11, wherein the fuel optimizing unit comprises a global positioning sensor disposed in the mobile asset for sensing the plurality of characteristic profiles comprising at least one of a distance from the first operating point to the second operating point along the predefined path, terrain profile associated with the path, ambient temperature and pressure, time required to traverse the distance, and location of one or more fuel stations along the predefined path.

13. The system of claim 11, further comprising a control unit configured to determine the fuel combustion ratio of the plurality of the fuels associated with at least one engine cylinder of the mobile asset based on the plurality of characteristic profiles.

14. The system of claim 13, wherein the control unit is further configured to control the fuel delivery system of the mobile asset so as to deliver the plurality of fuels to the at least one engine cylinder based on the fuel combustion ratio.

15. The system of claim 11, wherein the fuel optimizing unit comprises a memory for storing the plurality of characteristic profiles comprising sensed information associated with the mobile asset.

16. The system of claim 11, wherein the fuel optimizing unit is configured to maintain an actual emission level associated with usage of the plurality of fuels to less than or equal to a predefined threshold emission level.

17. The system of claim 16, wherein the fuel optimizing unit is configured to maintain an actual quantity of the plurality of fuels in the mobile asset to less than or equal to a predefined threshold quantity.

18. The system of claim 17, wherein the fuel optimizing unit is configured to maintain an actual cost associated with usage of the plurality of fuels to less than or equal to a predefined threshold cost.

19. The system of claim 11, wherein the fuel optimizing unit is configured to maintain the plurality of actual values associated with usage of the plurality of fuels to less than or equal to the predefined corresponding threshold values as a function of time and a corresponding location of the mobile asset along the predefined path.

20. The system of claim 11, wherein the fuel optimizing unit is disposed in the mobile asset comprising a locomotive.

21. A non-transitory computer readable medium encoded with a program to instruct a processor-based fuel optimizing unit to:

determine a plurality of characteristic profiles associated with a mobile asset moving from a first operating point to a second operating point along a predefined path, as a function of time and a corresponding location along the predefined path;

determine a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values; wherein the fuel combustion ratio comprises a ratio of the plurality of fuels to be delivered to the at least one engine cylinder; and control a fuel delivery system of the mobile asset so as to deliver the plurality of fuels to the at least one engine cylinder based on the fuel combustion ratio.

22. A method for operating a mobile asset utilizing a plurality of fuels, the method comprising:

determining a plurality of characteristic profiles associated with the mobile asset moving from a first operating point to a second operating point along a predefined path;

determining a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values; wherein maintaining the plurality of actual values comprises maintaining an actual quantity of the plurality of fuels in the mobile asset to less than or equal to a predefined threshold quantity and an actual cost associated with usage of the plurality of fuels to less than or equal to a predefined threshold cost, wherein the fuel combustion ratio comprises a ratio of the plurality of fuels to be delivered to the at least one engine cylinder; and controlling a fuel delivery system of the mobile asset so as to deliver the plurality of fuels to the at least one engine cylinder based on the fuel combustion ratio.

23. A method for operating a mobile asset utilising a plurality of fuels, the method comprising:

determining a plurality of characteristic profiles associated with the mobile asset moving from a first operating point to a second operating point along a predefined path;

determining a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values as a function of time and a corresponding location of the mobile asset along the predefined path; wherein the fuel combustion ratio comprises a ratio of the plurality of fuels to be delivered to the at least one engine cylinder; and controlling a fuel delivery system of the mobile asset so as to deliver the plurality of fuels to the at least one engine cylinder based on the fuel combustion ratio.

24. A system comprising:

a fuel optimizing unit configured to:

determine a plurality of characteristic profiles associated with a mobile asset utilizing a plurality of fuels, moving from a first operating point to a second operating point along a predefined path;

determine a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values; wherein the fuel combustion ratio comprises a ratio of the plurality of fuels to be delivered to the at least one engine cylinder; and control a fuel delivery system of the mobile asset so as to deliver the plurality of fuels to the at least one engine cylinder based on the fuel combustion ratio, and maintain an actual emission level associated with usage of the plurality of fuels to less than or equal to a predefined threshold emission level, an actual quantity of the plurality of fuels in the mobile asset to less than or equal to a predefined threshold quantity, and an actual cost associated with usage of the plurality of fuels to less than or equal to a predefined threshold cost.

25. A system comprising:

a fuel optimizing unit configured to:

determine a plurality of characteristic profiles associated with a mobile asset utilising a plurality of fuels, moving from a first operating point to a second operating point along a predefined path;

determine a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values as a function of time and a corresponding location of the mobile asset along the predefined path; wherein the fuel combustion ratio comprises a ratio of the plurality of fuels to be delivered to the at least one engine cylinder; and control a fuel delivery system of the mobile asset so as to deliver the plurality of fuels to the at least one engine cylinder based on the fuel combustion ratio.

* * * * *